(12) United States Patent
Nanno et al.

(10) Patent No.: US 7,514,174 B2
(45) Date of Patent: Apr. 7, 2009

(54) ELECTROCHEMICAL DEVICE INCLUDING ELECTROLYTE

(75) Inventors: Tetsuo Nanno, Yao (JP); Yukihiro Okada, Katano (JP); Yoichi Izumi, Moriguchi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/358,098

(22) Filed: Feb. 22, 2006

(65) Prior Publication Data
US 2006/0141362 A1   Jun. 29, 2006

Related U.S. Application Data

(62) Division of application No. 10/265,698, filed on Oct. 8, 2002, now Pat. No. 7,358,008.

(30) Foreign Application Priority Data

Oct. 12, 2001   (JP) .............................. 2001-315913

(51) Int. Cl.
*H01M 10/24* (2006.01)
*H01M 4/24* (2006.01)

(52) U.S. Cl. ................ 429/160; 429/161; 429/206; 429/209

(58) Field of Classification Search ............... None
See application file for complete search history.

(56) References Cited

U.S. PATENT DOCUMENTS

| | | | |
|---|---|---|---|
| 4,337,302 A | 6/1982 | Takizawa | |
| 4,376,156 A * | 3/1983 | Wheadon | 429/160 |
| 4,438,184 A | 3/1984 | Chenaux | |
| 6,680,140 B1 * | 1/2004 | Berlureau et al. | 429/57 |
| 6,821,673 B1 * | 11/2004 | Hamada et al. | 429/160 |
| 6,887,620 B2 * | 5/2005 | Klein et al. | 429/210 |
| 6,936,378 B2 * | 8/2005 | Randell | 429/206 |

FOREIGN PATENT DOCUMENTS

| | | |
|---|---|---|
| JP | 56-31465 | 3/1981 |
| JP | 61-284053 | 12/1986 |
| JP | 2-51849 | 2/1990 |
| JP | 2-177268 A | 7/1990 |
| JP | 4-95341 A | 3/1992 |
| JP | 11-204136 A | 7/1999 |
| JP | 2000-58031 A | 2/2000 |
| JP | 2000-106215 | 4/2000 |
| JP | 2001-143667 | 5/2001 |

OTHER PUBLICATIONS

Michael N. Hull et al., "Why Alkaline Cells Leak", J. Electrochem. Soc.: Electrochemical Science and Technology, Mar. 1977, vol. 124, No. 3, pp. 332-339.

* cited by examiner

*Primary Examiner*—John S Maples
(74) *Attorney, Agent, or Firm*—McDermott Will & Emery LLP

(57) ABSTRACT

An electrochemical device comprising an electrolyte and at least one electrode plate, the electrochemical device having a metal part constituting the electrode plate or being connected to the electrode plate; the electrolyte comprising a solute and a solvent dissolving the solute; the metal part having an insulating oxide layer for preventing the electrolyte from creeping on at least part of the surface of the metal part.

3 Claims, 8 Drawing Sheets

ELECTROCHEMICAL DEVICE INCLUDING ELECTROLYTE

RELATED APPLICATIONS

This application is a divisional of U.S. patent application Ser. No. 10/265,698, filed on Oct. 8, 2002, now U.S. Pat. No 7,358,008, which in turn claims the benefit of Japanese Application No. 2001-315913, filed on Oct. 12, 2001, the disclosures of which Applications are incorporated by reference herein.

BACKGROUND OF THE INVENTION

In recent years, there has been a highly increasing demand for electrochemical devices for various portable devices and hybrid electric vehicles. A concentrated sulfuric acid aqueous solution, a concentrated alkaline aqueous solution and the like have been used as electrolytes of electrochemical devices such as secondary batteries and capacitors. Further, non-aqueous solvents with lithium salt dissolved therein have been used as electrolytes of lithium ion secondary batteries. Many of the electrolytes cause corrosion of materials or damage to the human body because of liquid leakage thereof.

It is thus essential to prevent the liquid leakage of the electrolyte in the electrochemical device; however the electrolyte has a tendency to diffuse on a metal part. The phenomenon of diffusion of the electrolyte on the metal part is called creeping. M. N. Hull et al. gave the following causes of creeping of the electrochemical device using an alkaline electrolyte, in "J. Electrochem. Soc., 124, 3, 332 (1977)": (i) a decrease in surface tension of the electrolyte due to an electrocapillary action, (ii) an increase in alkaline concentration caused by reduction of oxygen on the interface of three phases formed by the electrolyte, oxygen and a negative electrode, and (iii) the transportation of the electrolyte driven by the increasing alkaline concentration.

When an adhesive is applied to a sealing part of the electrochemical device, with the affinity between the metal part and the electrolyte higher than the affinity between the adhesive and the metal part, the adhesive tends to be separated from the metal part by the action of the electrolyte. It has thus been difficult to prevent the liquid leakage of the electrolyte by the use of an adhesive.

Japanese Laid-Open Patent Publication No. 2000-58031 proposes the use of a hermetic seal. The hermetic seal has been in wide use for sealing electronic components as having high insulating properties and air-tightness. Since a thermal expansion coefficient of glass needs to be coordinated with a thermal expansion coefficient of a metal, however, it has been difficult to design the hermetic seal, limiting metals to expensive ones that can actually be used.

In a sealing part of a conventional electrochemical device, for example, a metal part having a surface layer made of butyl rubber and a gasket such as an O-ring in close contact with the surface layer have been used. In a capacitor including an electrolyte aqueous solution, a cylindrical rubber plug, having a through hole for passage of a current collecting terminal, has been used as a component for sealing an opening of a metal case.

However, in the aforesaid methods of physically blocking the electrolyte, there are required a step of compressing the gasket with the metal part, a step of caulking the rubber plug with the end of the metal case, and the like. This may hence raise problems of an increased production cost and of limited design of electrochemical devices. In the case of the capacitor, since a problem may arise that the electrolyte evaporates from the gap between the rubber plug and the current collecting terminal to cause an increase in internal resistance, reliable and inexpensive alternative techniques have been required.

Recently proposed has been an electrochemical device produced by stacking in series bipolar electrode plates each comprising a positive electrode, a negative electrode and a bipolar current collector carrying the positive electrode on one face thereof and the negative electrode on the other face thereof. In the electrochemical device comprising the bipolar electrode plate, it is of importance to prevent a short circuit between the electrode plates through the medium of the electrolyte. For this reason, Japanese Patent Publication No. 2623311, Japanese Laid-Open Patent Publication No. 11-204136 and Japanese Patent Publication No. 2993069 propose arranging an insulating material or a liquid impermeable material on the periphery of the bipolar current collector.

However, in the electrochemical device comprising the bipolar electrode plate, it is difficult to control the creeping of the electrolyte. Further, as long as a liquid electrolyte is in use, it is also difficult to prevent the transfer of the electrolyte between the electrode plates caused by fall or vibration of the electrochemical device. When the electrolyte causes occurrence of the short circuit between the electrode plates, problems of variation in charged state between the electrode plates, an increase in self-discharge, and the like, may arise. Meanwhile, an extreme reduction in amount of the electrolyte in order to prevent the transfer thereof results in shorter longevity of the electrochemical device. Accordingly, effective methods for preventing the short circuit between the stacked electrode plates caused by the electrolyte have been desired.

In recent times, sealed alkaline storage batteries have been used for power sources of electric power tools and hybrid electric vehicles. Because this usage necessitates a high-voltage power source, plural batteries connected in series are used.

However, a typical alkaline storage battery has: a case to accommodate, together with an electrolyte, an electrode plate assembly comprising a positive electrode plate, a negative electrode plate and a separator; and a sealing plate to seal the opening of the case. The cases and the sealing plates in number equivalent to the number of the batteries to be connected in series are thus needed, which is uneconomical. It is therefore considered that an effective manner is parting the inside of a closed-bottom resin case into plural spaces, inserting an element for power generation into each of the isolated spaces, and connecting in series the elements for power generation with a lead (lead wire), as in the case of a lead storage battery.

Compared to sulfuric acid to be used in the lead storage battery, however, an alkaline electrolyte to be used in the alkaline storage battery is more apt to creep on the surface of the metal part such as the lead. For this reason, there may be cases in which the elements for power generation connected in series are short-circuited through the medium of the electrolyte, leading to an increase in self-discharge or to variation in charged state between the elements for power generation. It is thus difficult to apply the structure of the lead storage battery, as it is, to that of the sealed alkaline storage battery.

BRIEF SUMMARY OF THE INVENTION

The present invention proposes, in an electrochemical device, an insulating oxide layer be arranged on a metal part constituting or being connected to an electrode plate for the purpose of preventing creeping of an electrolyte due to an electrocapillary action.

Namely, the present invention relates to an electrochemical device comprising an electrolyte and at least one electrode plate, the electrochemical device having a metal part constituting the electrode plate or being connected to the electrode plate; the electrolyte comprising a solute and a solvent dissolving the solute; the metal part having an insulating oxide layer for preventing the electrolyte from creeping on at least part of the surface of the metal part. It is preferable that as the insulating oxide layer, one that can form a chemical bond with the metal part is selected.

It is preferable that the metal part comprises at least one selected from the group consisting of Fe, Ni, Co, Cr, Cu, Al and Pb.

It is preferable that the insulating oxide layer has a specific resistance of not less than $10^6$ Ω·cm.

It is preferable that the insulating oxide layer comprises amorphous glass.

It is preferable that the insulating oxide layer contains at least one element selected from the group consisting of Si, B, Mg, Na, K, Al, Ca, Ba, Ti, Y, Cr, Ni and Zr.

It is preferable that the insulating oxide layer has a thickness of not less than 10 μm and not more than 200 μm.

It is preferable that the electrochemical device further comprises, between the metal part and the insulating oxide layer, a metal layer comprising at least one selected from the group consisting of Cr, Ni, Fe and Co.

It is preferable that the insulating oxide layer is covered with an insulating resin layer.

It is preferable that the insulating resin layer comprises at least one selected from the group consisting of polyolefin, polyether, polyacetal and polycarbonate.

It is preferable that the insulating oxide layer is covered with an insulating resin layer, and the combination of the insulating oxide layer and the insulating resin layer forms a sealing structure for sealing the electrolyte.

The present invention is particularly effective in an electrochemical device where the electrolyte is in liquid form or gelated form, the solute comprises an alkali metal hydroxide, and the solvent comprises water. It is particularly preferable that the electrolyte is in gelated form.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
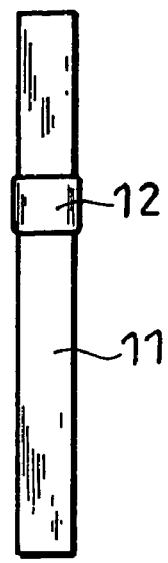
FIG. 1 is a front view of a lead made of nickel with an insulating oxide layer arranged thereon.

The present invention requires an insulating oxide layer which is arranged on a metal part in an electrochemical device using an electrolyte. In the place on the metal plate where the insulating oxide layer is arranged, the electrolyte is prevented from creeping. Since the creeping is most remarkable in the case of using an alkaline electrolyte, the present invention is particularly effective when the alkaline electrolyte is in use. The examples of the alkaline electrolyte may include an aqueous solution containing an alkali metal hydroxide dissolved therein and a non-aqueous solvent solution containing alkali metal salt dissolved therein.

There is no specific limitation to the metal part on which the insulating oxide layer is to be arranged. In the electrochemical device, the insulating oxide layer is applicable to all of the metal parts requiring prevention of creeping of the electrolyte. The insulating oxide layer can be arranged, for example, on a current collector of an electrode plate, a lead, a sealing part constituting a terminal, a metal case and the like.

To the insulating oxide layer, for example, amorphous glass is applicable. While amorphous glass of various compositions can be applied, desirable amorphous glass is one containing at least one element selected from the group consisting of Si, B, Mg, Na, K, Al, Ca, Ba, Ti, Y, Cr, Ni and Zr. For example, soda lime glass, aluminosilicate glass, alumino-borosilicate glass, borosilicate glass or the like can be used. It is preferable to use alumino-borosilicate glass, pyrex (registered trade mark) glass, porcelain enamel (glass lining) or the like, as having high alkali resistance. As preferable glass compositions given may be 76 to 86 wt % of $SiO_2$, 8 to 18 wt % of $B_2O_3$, 1 to 6 wt % of $Al_2O_3$, and 2 to 9 wt % of $Na_2O$.

Other than the aforesaid amorphous glass, ceramics such as $Al_2O_3$, $TiO_2$, $Y_2O_3$, $Gr_2O_3$, NiO and $ZrO_2$ can also be used. These ceramics all have high insulating properties and are hence suitable for insulation of the metal part to be applied with electric potentials.

It is preferable that the insulating oxide layer has a thickness of not less than 10 μm and not more than 200 μm. When the thickness is less than 10 μm, the insulation is insufficient and there may occur a creeping on the metal part due to a decrease of the surface tension of the electrolyte caused by the electrocapillary action. When the thickness of the insulating oxide layer is over 200 μm, a large distortion occurs on the interface between the metal and the insulating oxide layer, making the insulating oxide layer easy to be separated in heat cycles or the like.

In order to firmly bond the insulating oxide layer to the metal part, it is preferable that a metal layer comprising at least one selected from the group consisting of Cr, Ni, Fe and Co is in advance formed on the surface of the metal part. The metal layer preferably has a thickness of 0.1 to 20 μm.

In the case of using an insulating oxide layer with not very high alkali resistance, such as glass mainly composed of $SiO_2$, it is preferable that the surface of the insulating oxide layer is covered with an insulating resin layer with high alkali resistance. The insulating resin layer prevents corrosion of the insulating oxide layer caused by an alkaline electrolyte. In this case, since the insulating oxide layer is insulated, separation on the interface between the insulating oxide layer and the insulating resin layer is not caused by the action of an alkaline electrolyte.

As for the insulating resin, polyolefin such as polyethylene, polypropylene or polystyrene; polyether such as an epoxy resin or polyacetal; polycarbonate; polysulfide such as polyphenylene sulfide; a fluorocarbon resin such as polytetrafluoroethylene or polyvinylidene fluoride, or the like, is preferable as they have excellent alkali resistance.

The insulating oxide layer can form, together with the insulating resin layer, a sealing structure for sealing the electrolyte. For example, in a cylindrical battery, the sealing structure with excellent reliability can be formed by arranging the insulating oxide layer at the open-end of the metal case, arranging the insulating resin layer on the insulating oxide layer, and fixing a sealing plate at the open-end of the metal case.

The sealing structure with excellent reliability can be formed also by arranging the insulating oxide layer on a lead to be pulled out from the inside, a part constituting an external terminal, and the like, and arranging the insulating resin layer on the insulating oxide layer.

However, the insulating oxide layer is not for sealing the electrolyte like the conventional hermetic seal, but for preventing the creeping of the electrolyte due to the electrocapillary action. It is the insulating resin layer that serves to seal the electrolyte. Accordingly, a difference in thermal expansion coefficient between the insulating oxide layer and the metal part is not important, and in a number of combinations of metals and insulating oxides, reliability of the interface-bonding therebetween can be secured. On the other hand, because the conventional hermetic seal is for sealing the electrolyte, the thermal expansion coefficient of the insulating oxide layer and that of the metal part need to be coordinated, making the design of the hermetic seal difficult, as above described.

As one of embodiments of the present invention given can be an electrochemical device comprising at least two elements for power generation and at least one lead for electrically connecting the at least two elements for power generation (e.g., a sealed alkaline storage battery). Each of the elements for power generation comprises an electrolyte and at least one electrode plate. The electrolyte comprises a solute and a solvent dissolving the solute. The lead has an insulating oxide layer for preventing the electrolyte from creeping on at least part of the surface of the lead.

In the preferable embodiment, the at least two elements for power generation are accommodated in a case in the state of being isolated from each other so as not to be short-circuited, and the opening of the case is sealed with a sealing plate. The at least two elements for power generation are electrically connected with at least one lead, and the insulating oxide layer is arranged in band-shape on the lead. It is thus possible to attempt to reduce cost and improve an energy density by making plural elements for power generation share the inner space of one case. It should be noted that in order to make the elements for power generation be in the state of being isolated from each other so as not to be short-circuited, for example, each of the elements for power generation is accommodated in a small container such as a closed-bottom resin case, which is then accommodated in a bigger case.

The elements for power generation are electrically connected in series or parallel with at least one lead and at least part of the lead is covered with an insulating oxide. It is thereby possible to prevent the creeping of the electrolyte due to the electrocapillary action.

As one of embodiments of the present invention, an electrochemical device comprising an electrolyte and one or plural bipolar electrode plates being stacked can further be given. The bipolar electrode plate comprises a positive electrode, a negative electrode and a bipolar current collector carrying the positive electrode on one face thereof and the negative electrode on the other face thereof. The electrolyte comprises a solute and a solvent dissolving the solute. The periphery of the bipolar current collector has an insulating oxide layer for preventing the electrolyte from creeping on the surface of the periphery.

It is preferable that, when the bipolar current collector is in a substantially square shape, the insulating oxide layer arranged on the periphery of the bipolar current collector has a width not more than one tenth of the width of the bipolar current collector.

In the preferable embodiment, the one or plural bipolar electrode plates being stacked are interposed between a pair of end electrode plates, and the peripheral inside of each of the pair of end electrode plates has an insulating oxide layer for preventing the electrolyte from creeping on the surface of the peripheral inside. The insulating oxide layer arranged on the periphery of the bipolar current collector and the insulating oxide layer arranged on the peripheral inside of the pair of end electrode plates are bonded to each other with an adhesive. A monopolar electrode plate, having a positive electrode or a negative electrode on only one face thereof and the insulating oxide layer on the periphery thereof, can be used as the pair of end electrode plates.

In the present invention, it is preferable to use a gel electrolyte as the electrolyte. The use of a gel electrolyte enables prevention of transfer of the electrolyte caused by a shock of fall of the electrochemical device or the like. For example, in the case of using an alkaline aqueous solution as the electrolyte, cross-linked polyacrylic acid or polyvinylsulfonic acid, the salts thereof or the like is preferably used as a material for gel formation to gelate the electrolyte.

It is preferable that the material for gel formation is included in a positive electrode paste layer and a negative electrode paste layer of the electrode plate, a separator and the like. In this case, after the electrode plate assembly including the material for gel formation is accommodated togetherwith a liquid electrolyte in a case, the material for gel formation can be gelated in the battery. To make the material for gel formation included in the separator, it is possible that the material is gelated first and then applied to the separator.

The amount of the material for gel formation is desirably in the range of about 1 to 15 parts by weight per 100 parts by weight of the electrolyte. When the material for gel formation is in an amount below this range, an increase in viscosity of the electrolyte becomes insufficient; when the material for gel formation is in an amount over this range, the volume energy density of the battery decreases.

The positive electrode of the alkaline storage battery is produced, for example, with the use of a positive electrode paste mainly comprising nickel hydroxide. The negative electrode of the alkaline storage battery is produced, for example, with the use of a negative electrode paste mainly comprising a hydrogen storage alloy.

When a bipolar electrode plate is produced, for example, a nickel foam substrate is filled with the positive electrode paste, which is then fixed by welding or the like onto one face of a bipolar current collector. The positive electrode can also be obtained by applying the positive electrode paste directly onto one face of the bipolar current collector. The positive electrode can also be obtained by providing a porous sintered nickel layer on the surface of the bipolar current collector, impregnating nickel nitrate into the sintered nickel layer to be dried and immersing the whole into an alkaline aqueous solution to convert the nickel nitrate into nickel hydroxide. The negative electrode is arranged on the other face of the bipolar current collector.

The positive electrode and the negative electrode are arranged on the bipolar current collector. The periphery of the bipolar current collector is left for arrangement of the insulating oxide layer. In the viewpoint of a current collecting efficiency, it is preferable that the positive electrode and the negative electrode are not arranged on the insulating oxide layer. As the width of the insulating oxide layer increases, therefore, the area of the electrode plate decreases. Further, from the viewpoint of a volume energy density, it is preferable that the bipolar current collector is in a substantially square shape. It is desirable that the periphery for the arrangement of the insulating oxide layer has a width not more than one tenth of the width of the bipolar current collector. When the width of the periphery exceeds one tenth of the width of the bipolar current collector, the volume energy density of the battery extremely decreases.

It is preferable that the bipolar current collector comprises Fe or Ni from the viewpoint of the alkali resistance. For making the bonding between the insulating oxide layer and the bipolar current collector strong, it is desirable to form a metal layer comprising Cr, Ni, Fe, Co or the like between the bipolar current collector and the insulating oxide layer.

It is preferable that the electrode plate assembly comprising one or plural bipolar electrode plates being stacked is covered with an insulating film and then accommodated in a case. For the case used can be a metal case made of iron or nickel, a resin case mainly composed of polyethylene and polypropylene, or the like. Subsequently, the respective leads attached to the negative electrode and the positive electrode of the electrode plate assembly are electrically connected to the respective external terminals and the sealing plate is attached to the open edge of the case, to seal the opening of the case.

Below, specific examples of the present invention will be described in detail; however, the present invention is not limited to those examples.

Sample 1

In the following procedure, a glass layer 12 as an insulating oxide layer was formed on a Ni lead 11 as shown in FIG. 1:

First, the Ni lead 11 with a length of 50 mm, a width of 5 mm and a thickness of 0.15 mm was prepared, and the surface thereof was washed with aqua regia and then with pure water. A glass slurry comprising an alumino-borosilicate glass frit and ethanol was applied onto the area at a distance of 30 to 35 mm from the bottom edge of the lead and then dried. This was calcined under Ar atmosphere at 900° C. to form a glass layer with a thickness of 0.02 mm surrounding part of the Ni lead. This lead was referred to as Sample 1.

Sample 2

The area at a distance of 30 mm or shorter and the area at a distance of 35 to 40 mm from the bottom edge of a Ni lead treated by washing in the same manner as with Sample 1 were covered with a tape. Subsequently, the lead was immersed into a 0.5 M $Ni(NO_3)_2.6H_2O$ aqueous solution, which was placed between two Ni anode plates (50×10×0.15 mm) of a counter electrode. A current of 50 mA was passed for 240 seconds between the Ni lead as a cathode and the Ni anode plates, whereby $Ni(OH)_2$ was deposited on the whole area at a distance of 30 to 35 mm from the bottom edge of the Ni lead. After the tape was peeled, the lead was washed with water to be dried and then calcined under Ar atmosphere at 900° C. to form a NiO layer with a thickness of about 0.02 mm on part of the lead. This lead was referred to as Sample 2.

Sample 3

Onto the whole area at a distance of 30 to 35 mm from the bottom edge of a Ni lead treated by washing in the same manner as with Sample 1, an ethanol dispersion of polytetrafluoroethylene as a water repellent was applied so as to have a thickness of 0.02 mm. This lead was referred to as Sample 3.

Sample 4

Onto the whole area at a distance of 30 to 35 mm from the bottom edge of a Ni lead treated by washing in the same manner as with Sample 1, an epoxy resin adhesive was applied so as to have a thickness of 0.02 mm. This lead was referred to as Sample 4.

Sample 5

Onto the whole area at a distance of 30 to 35 mm from the bottom edge of a Ni lead treated by washing in the same manner as with Sample 1, an asphalt pitch-based sealing agent was applied so as to have a thickness of 0.02 mm. This lead was referred to as Sample 5.

Evaluation

Figure 2:
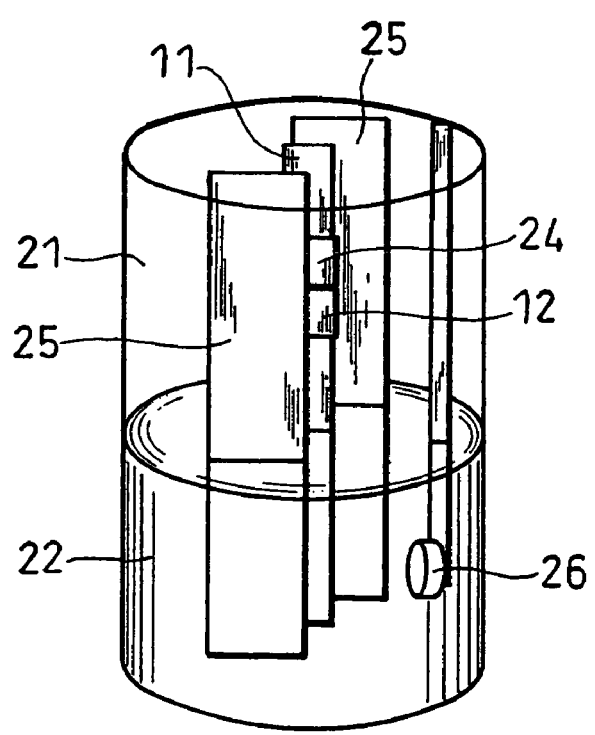
FIG. 2 is a schematic view of a test apparatus for evaluating creeping of an alkaline aqueous solution.

In the following procedure, a test apparatus as shown in FIG. 2 was assembled:

First, a 31 wt % KOH aqueous solution 22 was poured into a beaker 21, and the area at a distance of 20 mm or shorter from the bottom edge of the lead 11 of Sample 1 was immersed into the aqueous solution 22. Alkali detection paper 24 was affixed onto the area at a distance of 35 to 40 mm from the bottom edge of the lead 11.

Two Ni anode plates 25 (50×10×0.15 mm) were prepared and immersed into the aqueous solution 22 so as to be interposed by the lead 11. A reference Hg/HgO electrode 26 was immersed into the aqueous solution 22.

A voltage was applied between the upper part of the lead 11 and the upper parts of the Ni anode plates 25 such that the electric potential of the lead 11 became −0.9 V with respect to the reference electrode 26. The color tone of the alkali detection paper 24 was observed every 30 minutes.

The same tests as above were conducted on Samples 2 to 5. Further, for reference, the same test as above was conducted on Sample 4 except that the voltage was not applied to the lead. The time elapsed from the start of application of the voltage to the color change of the alkali detection paper 24 was shown in Table 1.

TABLE 1

| Sample | Electric potential of Ni lead (V, vs. Hg/HgO) | Time elapsed from start of voltage application to color change (hr) |
|---|---|---|
| 1 | −0.9 | >24 |
| 2 | −0.9 | >24 |
| 3 | −0.9 | 2 |
| 4 | −0.9 | 3.5 |
|   | —    | >24 |
| 5 | −0.9 | 3 |

As shown in Table 1, with the voltage applied to the Ni lead, there was observed no color change of the alkali detection paper in Samples 1 and 2 even after the elapse of 24 hours or longer. In Samples 3 to 5, on the other hand, the color changes of the alkali detection paper were observed after the elapse of 2 to 3.5 hours. It was thereby confirmed that: in Samples 1 and 2, the alkaline aqueous solution did not ascend along the Ni lead over the glass layer and the NiO layer, respectively; in Samples 3 to 5, the alkaline aqueous solution ascended along the Ni lead over the water repellent layer, the epoxy resin adhesive layer and the sealing agent layer, respectively. It should be noted that, in Sample 4 and Sample 5 with the voltage applied thereto, separation of the epoxy resin adhesive layer and the sealing agent layer from the Ni leads, respectively, were confirmed.

In Sample 4 where the voltage had not been applied to the Ni lead, there was observed neither the color change of the alkali detection paper nor separation of the epoxy resin adhesive layer from the Ni lead. One of the causes of the significant difference in test results between the case of applying the voltage to the Ni lead and the case of not applying the same is presumably that in the case of applying the voltage, the surface tension of the alkaline aqueous solution decreased due to the electrocapillary action. Another cause is presumably that an alkaline concentration increased in the vicinity of the lead through reduction of oxygen on the interface of three phases formed by the alkaline aqueous solution, oxygen and the electrode, which led to the action of the driving force in the ascent of the alkaline aqueous solution.

From the fact that the epoxy resin adhesive layer was separated from the Ni lead in Sample 4 with the voltage applied thereto, it is considered that the alkaline aqueous solution ascended along the interface between Ni and the adhesive while separating the adhesive layer from the surface of Ni. This is presumably because the affinity between Ni and the alkaline aqueous solution is higher than the affinity between the adhesive layer and Ni. It is considered that, also in Sample 5, the alkaline aqueous solution ascended along the interface between Ni and the sealing agent.

The reason for the ascent of the alkaline aqueous solution in Sample 3 with the voltage applied thereto was presumably that the weak bonding between the water repellent layer and the surface of the Ni lead facilitated the ascent of the alkaline aqueous solution along the interface between Ni and the water repellent. On the other hand, it was thought that the chemical bonding between Ni and the insulating oxide layer had been formed and that the alkaline aqueous solution was thereby unable to ascend along the interface between Ni and the insulating oxide.

Sample 6

A Cu lead with a length of 50 mm, a width of 5 mm and a thickness of 0.15 mm was prepared, and the surface thereof was washed with a 0.1 N hydrochloric acid and then with pure water. After the whole area at a distance of 30 to 35 mm from the bottom edge of the lead was Co-plated by electroless plating to have a thickness of 5 μm, a glass slurry comprising an alumino-borosilicate frit and ethanol was applied onto the same area of the lead and then dried. This was calcined under Ar atmosphere at 900° C. to form a glass layer with a thickness of 0.02 mm surrounding part of the Cu lead. This lead was referred to as Sample 6.

Sample 7

After the whole area at a distance of 30 to 35 mm from the bottom edge of a Cu lead treated by washing in the same manner as with Sample 6 was Cr-plated by electroless plating to have a thickness of 5 μm, a glass slurry comprising an alumino-borosilicate glass frit and ethanol was applied onto the same area of the lead and then dried. This was calcined under Ar atmosphere at 900° C. to form a glass layer with a thickness of 0.02 mm surrounding part of the Cu lead. This lead was referred to as Sample 7.

Evaluation

The same tests as those on Samples 1 to 5 were conducted.

As a result, no color change of the alkali detection paper was observed in Samples 6 and 7 using the Cu leads even after the elapse of 24 hours or longer.

Next, the present invention was applied to a sealed battery:

EXAMPLE 1

Figure 3:
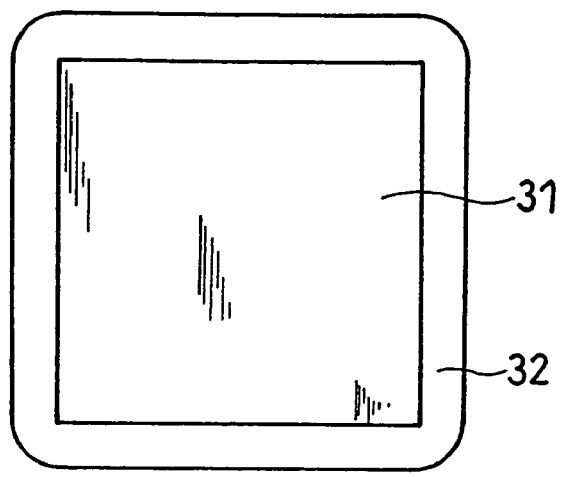
FIG. 3 is a front view of a steel plate with the insulating oxide layer arranged on the periphery thereof.
Figure 4:
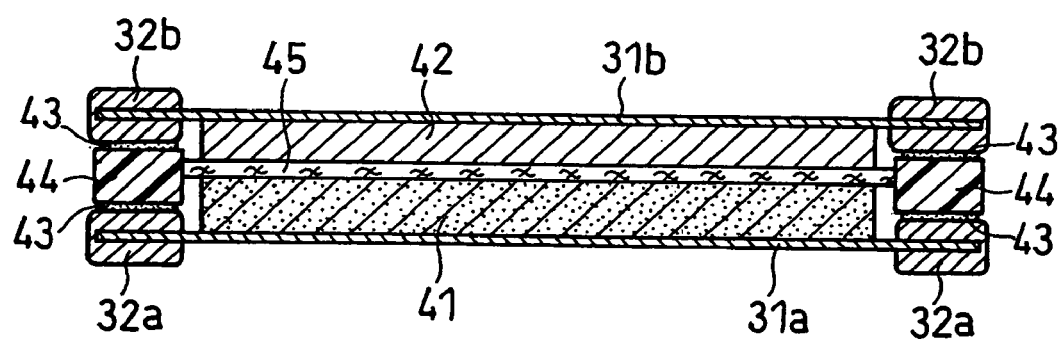
FIG. 4 is a vertical-sectional view of Battery A.

A description will be given by reference to FIG. 3 and FIG. 4:

Two steel plates 31 with the surfaces thereof Ni-plated, each being in a substantially square shape having a thickness of 0.1 mm and a side-width of 50 mm with the four corners thereof chamfered to be an arc shape of a radius of 5 mm, were prepared, and the surface thereof was washed with aqua regia and then pure water. Subsequently, the four sides of the steel plate 31 were immersed into a glass slurry comprising an alumino-borosilicate glass frit and ethanol to be dried, which was then calcined under Ar atmosphere at 900° C. to form a glass layer 32 with a width of 5 mm and a thickness of 20 μm on the periphery of each of the two steel plates 31. The glass layer had a specific resistance of $10^7$ Ω·cm.

Next, a nickel foam substrate was filled with a positive electrode paste comprising water and an active material mainly composed of $Ni(OH)_2$ to be dried and pressed, which was then cut into a square shape with a side-length of 38 mm to obtain a positive electrode 41. The positive electrode 41 was placed on one of the steel plates 31a. The thickness of the positive electrode 41 was 0.55 mm.

As a negative electrode material, an $MmNi_5$ (Mm is misch metal) type hydrogen storage alloy ($MmNi_{3.7}Mn_{0.4}Al_{0.3}Co_{0.6}$) was used. This alloy was grinded to pass through a 360 mesh-sieve, and then added with an aqueous solution containing 1.5 wt % of CMC to obtain a negative electrode paste. The obtained negative electrode paste was applied onto one face of the other steel plate 31b to be dried. A redundant hydrogen storage alloy was separated from the steel plate 31b so as to make a negative electrode paste layer be a square with a side-length of 38 mm. The mixture layer was pressed to obtain a negative electrode 42. The thickness of the negative electrode 42 was 0.33 mm.

An epoxy resin adhesive 43 was applied onto the glass layer 32a of the steel plate 31a on the positive electrode side, and then a frame body 44 made of polypropylene with a thickness of 1 mm was bonded to the glass layer. A sulfonated non-woven fabric made of polypropylene being a square shape with a side-length of 39 mm, a basis weight of 66 g/m² and a thickness of 0.15 mm was placed as a separator 45 on the positive electrode 41. 0.65 mL of 31 wt % KOH aqueous solution was poured from thereabove. Subsequently, the epoxy resin adhesive 43 was applied onto the frame body 44, the steel plate 31b was arranged such that the separator 45 and the negative electrode 42 were mutually opposed, and the frame body 44 was bonded to the glass layer 32b of the steel plate 31b. The battery as thus fabricated was referred to as Battery A of EXAMPLE 1.

EXAMPLE 2

Two steel plates with the surfaces thereof Ni-plated, each being in a substantially square shape having a thickness of 0.1 mm and a side-width of 50 mm with the four corners thereof chamfered to be an arc shape of a radius of 5 mm, were prepared, and the surface thereof was washed with aqua regia and then pure water. Subsequently, the 40 mm-square central parts of both faces of each of the steel plates were covered with tapes. The steel plate covered with the tapes was immersed into a 0.5 M $Ni(NO_3)_2 \cdot 6H_2O$ aqueous solution and placed between two Ni anode plates (70×70×0.15 mm) of a counter electrode. A current of 900 mA was passed for 480 seconds between the steel plate as a cathode and the Ni anode plates to deposit $Ni(OH)_2$ on the four sides of the steel plate. After peeling the tapes, the steel plate was washed with water and dried, which was then calcined under Ar atmosphere at 900° C. to form a NiO layer with a width of 5 mm and a thickness of about 20 μm on the four sides of the steel plate. The NiO layer had a specific resistance of $10^6$ Ω·cm.

Except that the NiO layer was arranged as an insulating oxide layer as thus described, a battery was fabricated in the same manner as in EXAMPLE 1. The obtained battery was referred to as Battery B of EXAMPLE 2.

COMPARATIVE EXAMPLE 1

Except that the glass layer was not formed on the four sides of the steel plate, a battery was fabricated in the same manner as in EXAMPLE 1. The obtained battery was referred to as Battery C of COMPARATIVE EXAMPLE 1.

Evaluation

Batteries A to C were each charged at a current of 0.1 C for 16 hours and discharged at a current of 0.2 C until the battery voltage reached 1.0 V, while being pressed with a pressing-jig in the thickness direction of the battery in order to suppress the expansion thereof. After the discharge, the periphery of each battery was wiped with alkali detection paper to observe presence or absence of liquid leakage. The results are shown in Table 2.

TABLE 2

| Battery | Liquid leakage |
|---------|----------------|
| A | None |
| B | None |
| C | Leaked |

In Battery C of COMPARATIVE EXAMPLE 1 where the liquid leakage was found, separation of the epoxy resin adhesive from the periphery of the steel plate on the negative electrode side was observed, while in Batteries A and B of EXAMPLES 1 and 2, such separation was not observed. It was thereby revealed that the electrolyte in the electrochemical device can be sealed according to the present invention.

EXAMPLE 3

Figure 5:
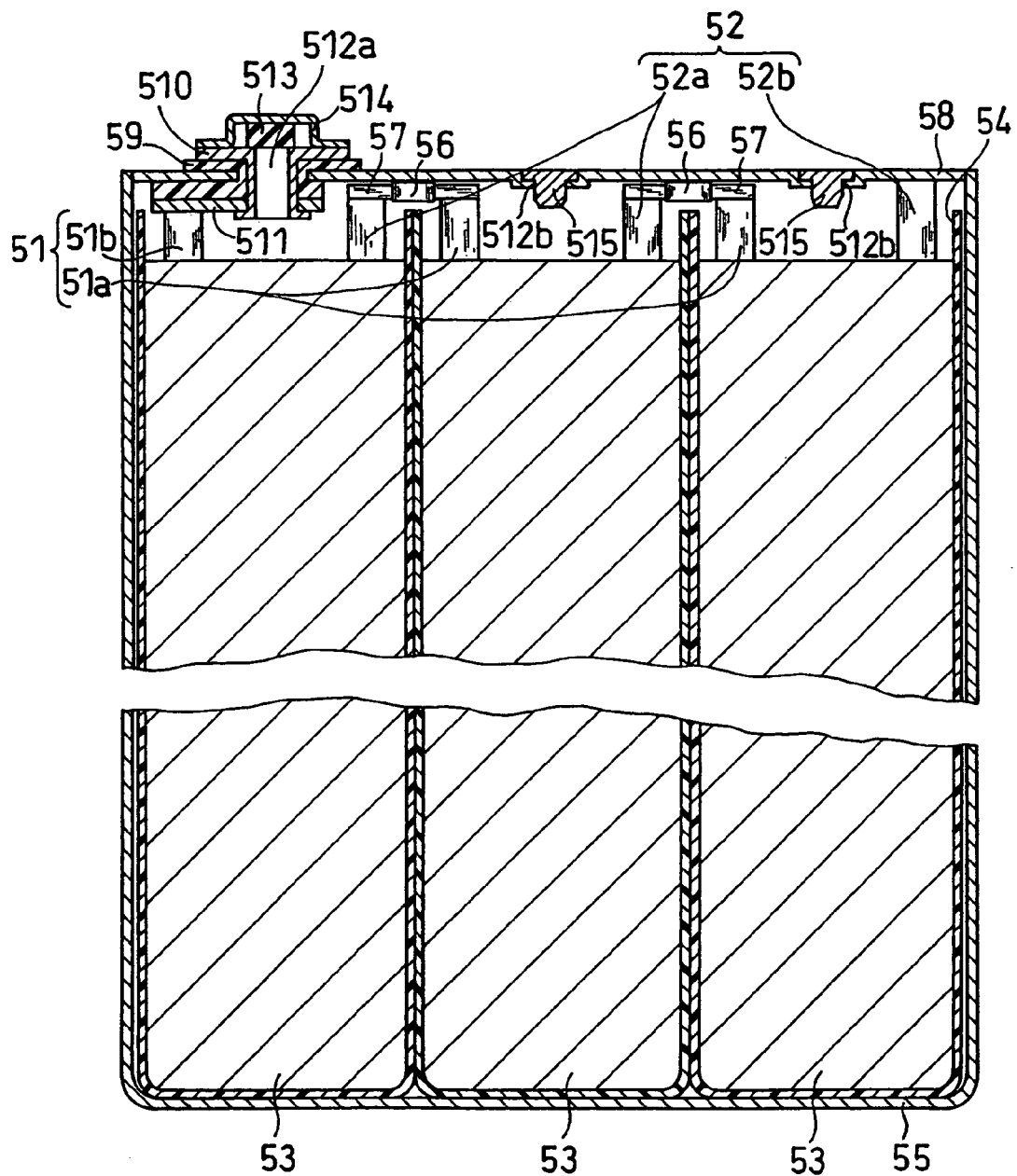
FIG. 5 is a vertical sectional view of Battery D.

A description will be given by reference to FIG. 5:

A nickel foam substrate was filled with a positive electrode paste comprising water and an active material mainly composed of $Ni(OH)_2$ to be dried and pressed, which was then cut into a rectangular shape with a length of 40 mm and a width of 9 mm to obtain a positive electrode plate. The thickness of the positive electrode plate was 0.75 mm.

As a negative electrode material, an $MmNi_5$ (Mm is misch metal) type hydrogen storage alloy ($MmNi_{3.7}Mn_{0.4}Al_{0.3}Co_{0.6}$) was used. This alloy was grinded to pass through a 360 mesh-sieve, and then added with an aqueous solution containing 1.5 wt % of CMC to obtain a negative electrode paste. The obtained negative electrode paste was applied onto both faces of a steel plate having a thickness of 0.06 mm, with Ni-plated and apertures arranged, to be dried and pressed, which was then cut into a rectangle with a length of 42 mm and a width of 10 mm to obtain a negative electrode plate. The thickness of the negative electrode plate was 0.45 mm.

Three positive electrode plates and four negative electrode plates were prepared. A positive electrode lead 51 was welded to each of the positive electrode plates and a negative electrode lead 52 was welded to each of the negative electrode plates. Subsequently, each of the positive electrode plates was wrapped with a sack-like separator made of a non-woven fabric having a thickness of 0.15 mm and a basis weight of 60 g/m², with potassium salt of polyacrylic acid applied thereonto. As the non-woven fabric used was made of sulfonated polypropylene.

The four negative electrode plates and the three positive electrode plates wrapped with the separator were stacked alternately to constitute an element 53 for power generation. Three elements 53 for power generation were produced and each was inserted into a closed-bottom resin case 54 made of polypropylene. The elements for power generation accommodated in the closed-bottom resin cases 54 were accommodated into a metal case 55 three times larger than the closed-bottom resin case 54.

Meanwhile, a Ni lead with a length of 6 mm was prepared, and a glass slurry comprising an alumino-borosilicate glass frit and isopropanol was applied onto the central part of the Ni lead and then dried. This was calcined under Ar atmosphere at 900° C. to form a glass layer 56 with a thickness of 0.1 mm and a width of 2 mm in the central part of the Ni lead to produce a connecting lead 57. The glass layer 56 had a specific resistance of $10^7$ Ω·cm.

A positive electrode lead 51a of a predetermined element for power generation and a negative electrode lead 52a of another predetermined element for power generation were welded to each other with a connecting lead 57, and by using two of the connecting lead 57, the three elements for power generation were connected in series. On the other hand, the other positive electrode lead 51b and the negative electrode lead 52b were connected to predetermined parts of a sealing plate 58 having three apertures for liquid pouring. The sealing plate 58 and the metal case 55 were laser-welded to each other, and a 30 wt % KOH aqueous solution was poured to each of the elements for power generation through the aperture for liquid pouring.

A gasket 59 was engaged to one of the apertures for liquid pouring. An iron rivet 510 was inserted in the aperture 512a via the gasket 59 and fixed thereto with its bottom edge crimped to a washer 511. The positive electrode lead 51b was connected to the washer 511 by resistance welding. The negative electrode lead 52b was directly connected to the sealing plate 58 also serving as a negative electrode terminal. The aperture 512a for liquid pouring was sealed with a positive electrode terminal cap 514 having a rubber valve 513 by connecting the rivet 510 with the cap 514 by resistance welding. The remaining two apertures 512b for liquid pouring were sealed by welding metal sealing plugs 515. The sealed alkaline storage battery as thus fabricated was referred to as Battery D of EXAMPLE 3.

EXAMPLE 4

A Ni lead with a length of 6 mm was prepared and the both ends thereof were covered with tapes. This lead was immersed into a 0.5 M $Ni(NO_3)_2 \cdot 6H_2O$ aqueous solution and placed between two Ni anode plates (50×10×0.15 mm) of a counter electrode, and a current of 20 mA was passed for 240 seconds between the Ni lead as a cathode and the Ni anode plates to deposit $Ni(OH)_2$ on the central part of the Ni lead.

This was washed with water and dried, which was then calcined under Ar atmosphere at 900° C. to form a NiO layer with a thickness of about 0.02 mm in the central part of the Ni lead. The NiO layer had a specific resistance of $10^6$ Ω·cm. Thereafter, the tapes at the both ends of the Ni lead were removed.

Except that the NiO layer was arranged as an insulating oxide layer as thus described, a battery was fabricated in the same manner as in EXAMPLE 3. The obtained battery was referred to as Battery E of EXAMPLE 4.

COMPARATIVE EXAMPLE 2

Except that a normal Ni lead was used for the electric connection between the elements for power generation, a battery was produced in the same manner as in EXAMPLE 3. The obtained battery was referred to as Battery F of COMPARATIVE EXAMPLE 2.

COMPARATIVE EXAMPLE 3

Except that a film made of polypropylene (thickness: 0.1 mm) was thermally adhered to the central part of the Ni lead, a battery was produced in the same manner as in COMPARATIVE EXAMPLE 2. The obtained battery was referred to as Battery G of COMPARATIVE EXAMPLE 3.

EXAMPLE 5

Except that a sulfonated non-woven fabric made of polypropylene was used as it was as a separator instead of applying potassium salt of polyacrylic acid onto the separator, a battery was produced in the same manner as in EXAMPLE 3. The obtained battery was referred to as Battery H of EXAMPLE 5.

Evaluation

Batteries D to H were all sealed nickel-metal hydride storage batteries with an operating voltage of 3.6 V and the theoretical battery capacity of each of the batteries was 500 mAh.

For the purpose of activating Batteries D to H, the batteries underwent five cycles of charge/discharge. The pattern of one cycle was that the battery was charged at a current of 0.1 C for 16 hours, put to a one-hour rest, discharged at a current of 0.2 C until the battery voltage reached 3.0 V and then put to another one-hour rest.

Next, the charge/discharge cycle life of each of the activated batteries D to H was observed.

Figure 6:
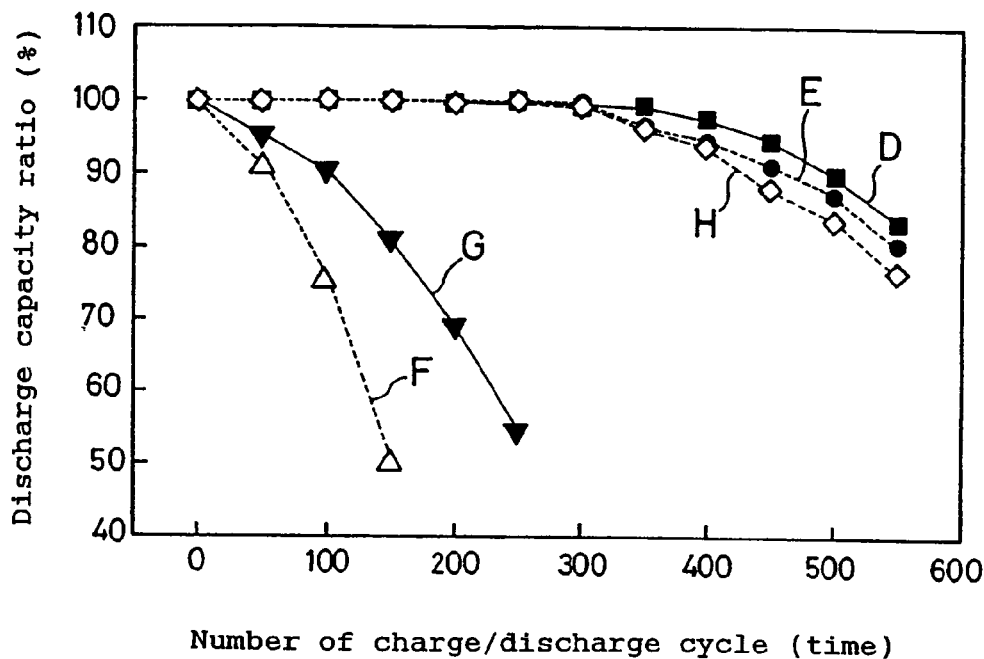
FIG. 6 is a graph representing the relations between the number of charge/discharge cycles and discharge capacity ratios of Batteries D to H.

The pattern repeated herein was that the battery was charged at a current of 0.5 C up to 105% of the theoretical capacity, put to a 30-minute rest, discharged at a current of 0.5 C until the battery voltage reached 3 V, and then put to another 30-minute rest. Every 50 cycles, each of the batteries was charged at a current of 0.1 C for 16 hours, put to a one-hour rest, discharged at a current of 0.2 C until the battery voltage reached 3 V and then put to another one-hour rest, to measure the capacity of the battery. The ratio of the discharge capacity thus obtained to the initial discharge capacity was calculated on percentage as a discharge capacity ratio. FIG. 6 shows the relations between the discharge capacities and the number of the charge/discharge cycles.

Figure 7:
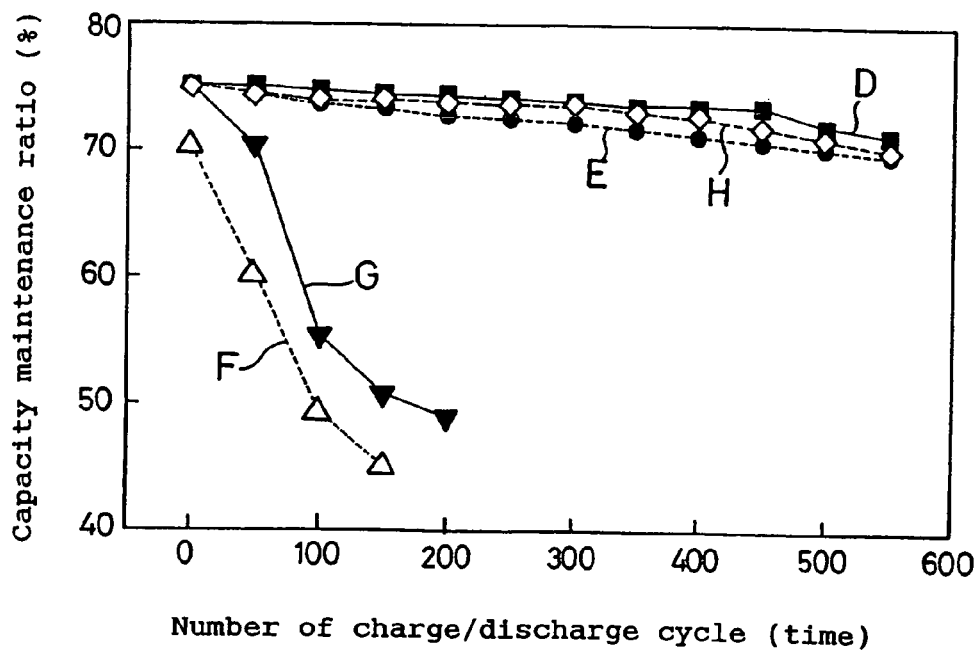
FIG. 7 is a graph representing the relations between the number of charge/discharge cycles and capacity maintenance ratios of Batteries D to H.

Each of the batteries after the measurement of the capacity thereof in the same manner as above was charged at a current of 0.1 C for 16 hours, stored under an atmosphere at 45° C. for two weeks, and then discharged at a current of 0.2 C until the battery voltage reached 3 V. The ratio of the capacity of the battery after the storage to the capacity of the battery before the storage was calculated on percentage as a capacity maintenance ratio. FIG. 7 shows the relations between the capacity maintenance ratios and the number of charge/discharge cycles.

It was found, as shown in FIG. 6 and FIG. 7, that there were drastic decreases in discharge capacity ratios and capacity maintenance ratios of Batteries F and G. The capacity maintenance ratio decreased presumably because the alkaline electrolyte crept on the lead connecting between the elements for power generation, and the electrolyte hence caused a short circuit of the elements for power generation. The discharge capacity ratio decreased presumably because there was a variation in charged state between the elements for power generation due to the short-circuit caused by the electrolyte and over-charge/over-discharge were thus repeated with some of the elements for power generation.

Next, drop tests were conducted on activated Batteries D to H in the following procedure:

First, in the pattern that the battery was charged at a current of 0.1 C for 16 hours, put to a one-hour rest, discharged at a current of 0.2 C until the battery voltage reached 3 V and then put to another one-hour rest, the capacity of each of the batteries was measured. Next, the battery was charged at a current of 0.1 C for 16 hours, stored in a constant temperature bath at 45° C. for two weeks, and after being returned to room temperature, discharged at a current of 0.2 C until the battery voltage reached 3 V to measure the remaining capacity. The ratio of the obtained remaining capacity to the capacity before the storage was calculated on percentage as a capacity maintenance ratio.

Subsequently, each of the batteries was dropped from a height of 50 cm onto a concrete floor six times so that six faces of the battery landed on the floor. These six times of drops were made to be one set and totally ten sets of drops were conducted. The capacity maintenance ratio of the battery dropped was then calculated in the same manner as above. Table 3 shows the capacity maintenance ratios of the batteries before and after the drops.

TABLE 3

| Battery | Capacity maintenance ratio before drop (%) | Capacity maintenance ratio after drop (%) |
|---------|---------|---------|
| D | 75.1 | 74.8 |
| E | 75.3 | 74.9 |
| F | 70.3 | 65.3 |
| G | 75.2 | 73.8 |
| H | 75.0 | 0.5 |

As shown in Table 3, in Battery H where potassium salt of polyacrylic acid as an agent for gel formation had not been applied onto the separator, the maintenance ratio drastically decreased after the drop. This is presumably because, due to the shock of the drop, the electrolyte was eluted from the separator and the electrode plate and transferred between the elements for power generation, causing the short-circuit therebetween. It was revealed from this result that it is possible to provide a sealed alkaline secondary battery reliable against the shock, by applying the gel electrolyte to the present invention.

EXAMPLE 6

A nickel foam substrate was filled with a positive electrode paste comprising water and an active material mainly composed of $Ni(OH)_2$ to be dried and pressed, which was then cut into a rectangular shape with a length of 27 mm and a width of 15 mm to obtain a positive electrode plate. The thickness of the positive electrode plate was 0.8 mm.

As a negative electrode material, an $MmNi_5$ (Mm is misch metal) type hydrogen storage alloy ($MmNi_{3.7}Mn_{0.4}Al_{0.3}Co_{0.6}$) was used. This alloy was grinded to pass through a 360 mesh-sieve, and then added with an aqueous solution containing 1.5 wt % of CMC to obtain a negative electrode paste. The obtained negative electrode paste was applied onto both faces of a steel plate having a thickness of 0.03 mm, with Ni-plated and apertures arranged, and then dried and pressed, which was cut into a rectangular shape with a length of 27 mm and a width of 15 mm to obtain a negative electrode plate. The thickness of the negative electrode plate was 0.45 mm.

Three positive electrode plates and four negative electrode plates were prepared. A positive electrode lead was welded to each of the positive electrode plates and a negative electrode lead was welded to each of the negative electrode plates. Subsequently, each of the positive electrode plates was wrapped with a sack-like separator made of non-woven fabric having a thickness of. 0.12 mm and a basis weight of 60 g/m². As the non-woven fabric used was made of sulfonated polypropylene. The four negative electrode plates and the three positive electrode plates wrapped with the separator were stacked alternately to constitute an element for power generation. The element for power generation was accommodated in a closed-bottom metal case.

Figure 8:
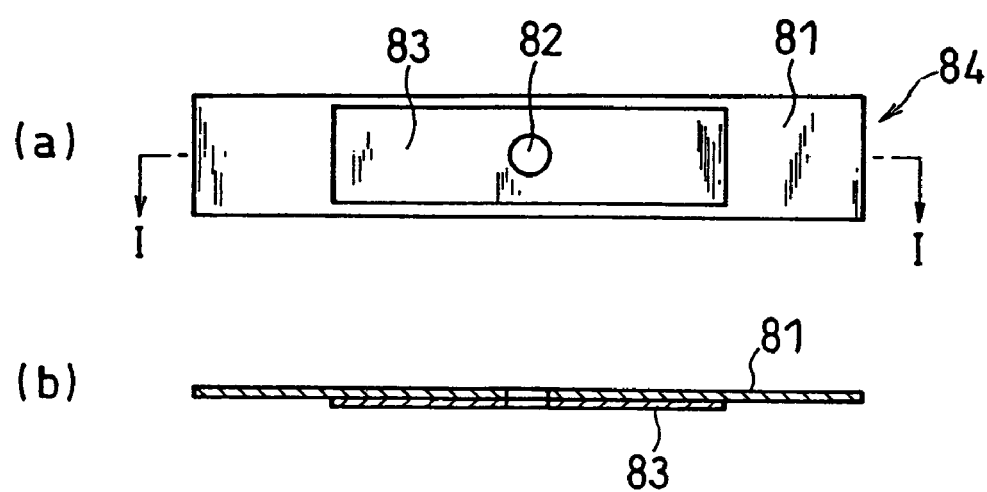
FIG. 8 is a front view (a) and a sectional view (b) of the sealing plate of Battery d.

Meanwhile, a steel plate 81 with a length of 34 mm, a width of 6 mm and a thickness of 0.4 mm was Ni-plated and an aperture 82 with a diameter of 2.8 mm was arranged in the center thereof. A glass slurry comprising an alumino-borosilicate glass frit and isopropanol was applied onto the area with a length of 20 mm and a width of 5 mm in the central part of one face of the steel plate 81, and then dried. This was calcined under Ar atmosphere at 900° C. to form a glass layer 83 with a thickness of 0.1 mm on one face of the steel plate. The glass layer had a specific resistance of $10^7$ Ω·cm. A sealing plate 84 was thus produced. FIG. 8 shows the front view (a) and the I-I line cross-sectional view (b) thereof.

The sealing plate 84 and the closed-bottom metal case accommodating the element for power generation were laser-welded to each other such that the side of the glass layer 83 became an inter face, and a 30 wt % KOH aqueous solution was poured through the aperture 82. A gasket was engaged to the aperture 82 as in EXAMPLE 3. An iron rivet was inserted into the aperture 82 via the gasket and fixed thereto with its bottom edge crimped to a washer. The positive electrode lead was connected to the washer by resistance welding. The negative electrode lead was directly connected to the metal part of the sealing plate 84 also serving as a negative electrode terminal. As in EXAMPLE 3, the aperture 82 was sealed with a positive electrode terminal cap having a rubber valve by connecting the rivet with the cap by resistance welding. The sealed alkaline storage battery as thus fabricated was referred to as Battery d of EXAMPLE 6.

COMPARATIVE EXAMPLE 4

Except that a glass layer was not arranged on the sealing plate, a battery was fabricated in the same manner as in EXAMPLE 6. The obtained battery was referred to as Battery e of COMPARATIVE EXAMPLE 4.

Evaluation

Batteries d and e were both sealed nickel-metal hydride storage batteries with an operating voltage of 1.2 V, and the theoretical battery capacity of each of the batteries was 600 mAh.

For the purpose of activating Batteries d and e, the batteries underwent five cycles of charge/discharge. The pattern of one cycle was that the battery was charged at a current of 0.1 C for 16 hours, put to a one-hour rest, charged at a current of 0.2 C until the battery voltage reached 1.0 V and then put to another one-hour rest.

A heat cycle test was conducted by using 10 cells each of activated Batteries d and e. In this test, the cycle of storage of the battery at 65° C. for six hours and subsequent storage thereof at −10° C. for 6 hours was repeated 60 times.

After completion of the test, there was observed presence or absence of liquid leakage by wiping the periphery of the positive electrode terminal with alkali detection paper. As a result, no liquid leakage was observed in the ten cells of Battery d, while the liquid leakage was observed in five cells out of the ten cells of Battery e.

EXAMPLE 7

Figure 10:
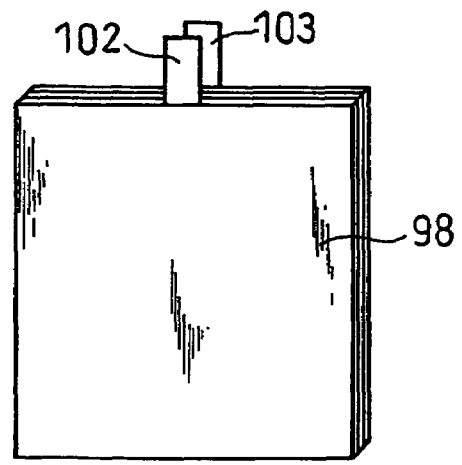
FIG. 10 is an oblique view of the electrode plate assembly of Battery I.
Figure 11:
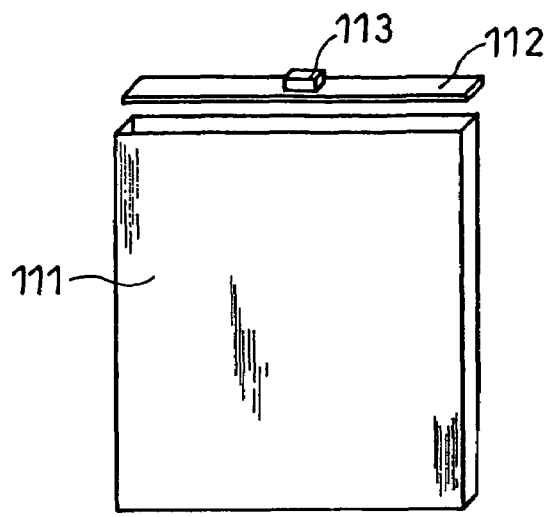
FIG. 11 is an oblique view of the case and the sealing plate of Battery I.

A description will be given by reference to FIGS. 9 to 11:

Four steel plates 91 with the surfaces thereof Ni-plated, each being in a substantially square shape having a thickness of 0.1 mm and a side-width of 100 mm with the four corners thereof chamfered to be an arc shape of a radius of 5 mm, were prepared, and the surface thereof was washed with aqua regia and then pure water. Subsequently, the four sides of the steel plate 91 were immersed into a glass slurry comprising an alumino-borosilicate glass frit and isopropanol and then dried, which was calcined under Ar atmosphere at 900° C. to form a glass layer 92 with a width of 5 mm and a thickness of 0.1 mm on the periphery of each of the four steel plates. The glass layer had a specific resistance of $10^7$ Ω·cm. The obtained steel plate was used as a bipolar current collector.

As a negative electrode material, an $MmNi_5$ (Mm is misch metal) type hydrogen storage alloy ($MmNi_{3.7}Mn_{0.4}Al_{0.3}Co_{0.6}$) was used. This alloy was grinded to pass through a 360 mesh-sieve, and then added with an aqueous solution containing 1.5 wt % of CMC to obtain a negative electrode paste. The obtained negative electrode paste was applied onto one face of the bipolar current collector and then dried, and redundant hydrogen storage alloy was then separated so as to make the negative electrode paste layer a square with a side-length 85 mm, and pressed to obtain a negative electrode 93. The thickness of the negative electrode 93 was 0.35 mm.

Next, a nickel foam substrate was filled with a positive electrode paste comprising water and an active material mainly composed of $Ni(OH)_2$ and then dried and pressed, which was cut into a square with a side-length of 83 mm to obtain a positive electrode 94. The positive electrode 94 was placed in the central part of the other face of the bipolar current collector. The thickness of the positive electrode 94 was 0.55 mm.

Two sets of bipolar electrode plates having the positive electrode 94 on one face thereof and the negative electrode 93 on the other face thereof were thus produced.

Further, one monopolar electrode plate having only the negative electrode 93 on one face of the bipolar current collector and one monopolar electrode plate having only the positive electrode 94 on one face of the bipolar current collector were prepared.

Next, 200 mL of 30 wt % KOH aqueous solution and 20 g of potassium polyacrylate having been passed through a 360 mesh-sieve were mixed and stirred, which was then defoamed under a reduced pressure to prepare a gelated alkaline electrolyte.

Into the gelated alkaline electrolyte, a sulfonated non-woven fabric separator made of polypropylene in a square shape with a side-length of 88 mm (thickness: 0.2 mm, basis weight: 72 g/m$^2$) was immersed and then defoamed under a reduced pressure so as to make the gelated electrolyte impregnated into the separator. The separator 95 with the electrolyte impregnated therein was arranged on the positive electrode 94 of the monopolar electrode plate having only the positive electrode. The bipolar plate was arranged thereon via the separator 95 such that the positive electrode 94 and the negative electrode 93 were mutually opposed. This operation was repeated one more time. Thereon, the monopolar electrode plate having only the negative electrode 93 was arranged via the separator 95 such that the positive electrode 94 and the negative electrode 93 were mutually opposed. A frame body 97 made of polypropylene with a thickness of 1.1 mm was interposed between the glass layers 92 of the adjacent current collectors via an epoxy resin adhesive 96. Finally, the adhesive 96 was cured by heat to obtain a sealed electrode plate assembly 98.

A negative electrode lead 102 and a positive electrode lead 103 were connected to the negative electrode 93 and the positive electrode 94, respectively, on the outermost side of the electrode plate assembly 98.

Thereafter, the electrode plate assembly 98 was covered with a heat shrinkable film and inserted into a closed-bottom metal case 111. The negative electrode lead 102 was then welded to a sealing plate 112. Further, the positive electrode lead 103 was welded to a positive electrode terminal 113 equipped with a safe valve. The positive electrode terminal was arranged on the sealing plate 112 via an insulating material. The sealing plate 112 and the open-end of the case 111 were welded to each other by laser-welding to complete a bipolar nickel-metal hydride storage battery. This battery was referred to as Battery I of EXAMPLE 7.

EXAMPLE 8

Figure 12:
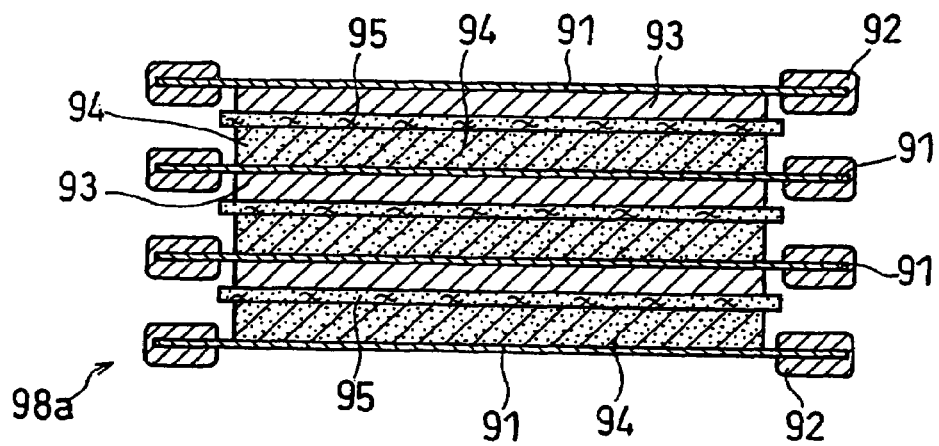
FIG. 12 is a vertical sectional view of Battery J.

Except that the gap between glass layers each arranged on the periphery of each of the bipolar current collectors was not sealed with a frame body and an epoxy resin adhesive, a bipolar nickel-metal hydride storage battery having an electrode plate assembly 98a as shown in FIG. 12 was fabricated in the same manner as in EXAMPLE 7. This battery was referred to as Battery J of EXAMPLE 8.

EXAMPLE 9

Figure 9:
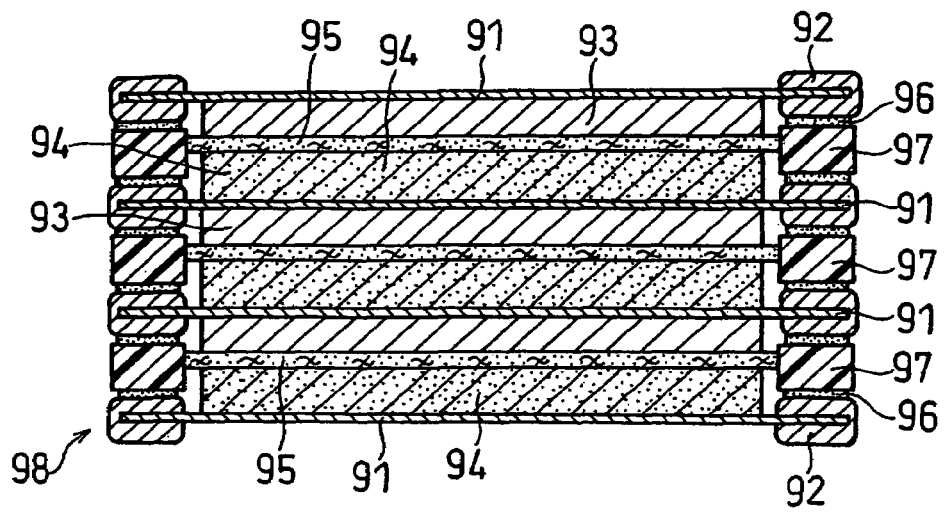
FIG. 9 is a vertical sectional view of the electrode plate assembly of Battery I.

Except that a 30 wt % KOH aqueous solution was singly used as an electrolyte in place of the gelated electrolyte, a bipolar nickel-metal hydride storage battery as shown in FIG. 9 was fabricated in the same manner as in EXAMPLE 7. This battery was referred to as Battery K of EXAMPLE 9.

COMPARATIVE EXAMPLE 5

Except that a glass layer was not arranged on the periphery of each bipolar current collector, a bipolar nickel-metal hydride storage battery was fabricated in the same manner as in EXAMPLE 7. This battery was referred to as Battery L of COMPARATIVE EXAMPLE 5. A frame body made of polypropylene with a thickness of 1.1 mm was interposed between the peripheries of adjacent current collectors via an epoxy resin adhesive.

COMPARATIVE EXAMPLE 6

Figure 13:
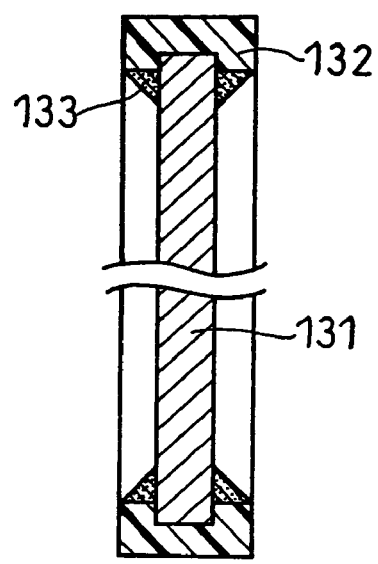
FIG. 13 is a vertical sectional view of the bipolar current collector of Battery M.

A description will be given by reference to FIG. 13:

Four steel plates 131 with the surfaces thereof Ni-plated, each being a square having a thickness of 0.1 mm and a side-width of 100 mm, were prepared. A polypropylene resin layer 132 was arranged on the periphery of the four sides by injection molding. Thereafter, A polytetrafluoroethylene resin dispersed in ethanol was applied onto an inner angle part where the face of the steel plate and the resin layer 132 crossed at right angle, to form a water repellent layer 133 which was a substantially triangle in cross section. By this means, the steel plate 131 with the insulating resin layer 132 and water-repellent layer 133 attached to the periphery thereof was used as a bipolar current collector, while an epoxy resin adhesive was not used. Further, a 30 wt % KOH aqueous solution was impregnated into the separator. Except that, a bipolar nickel-metal hydride storage battery was fabricated in the same manner as in EXAMPLE 7. This battery was referred to as Battery M of COMPARATIVE EXAMPLE 6. Battery M corresponds to the battery disclosed in Japanese Patent Publication No.2623311.

COMPARATIVE EXAMPLE 7

Figure 14:
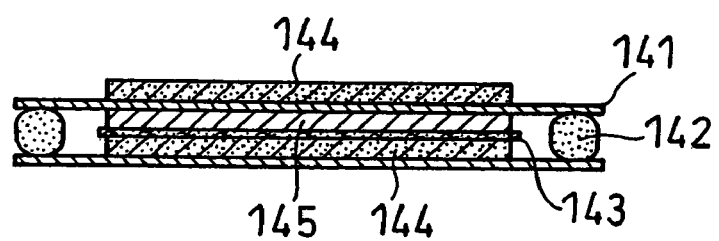
FIG. 14 is a vertical sectional view of part of the electrode plate assembly of Battery N.

A description will be given by reference to FIG. 14 illustrating part of an electrode plate assembly in the production process:

Four steel plates 141 with the surfaces thereof Ni-plated, each being a square having a thickness of 0.1 mm and a side-width of 100 mm, were prepared. To the periphery of the four sides of each plate, an ethanol dispersion including a silica powder and a polytetrafluoroethylene powder was applied. The steel plate was used as a bipolar current collector. A 30 w % KOH aqueous solution was impregnated into a separator 143. As a positive electrode 144 and a negative electrode 145, the same ones were used as in EXAMPLE 7. An electrolyte impermeable and gas permeable resin composition 142 with a thickness of 1.5 mm was provided between the peripheries of the bipolar plates. Except that, an electrode plate assembly was produced in the same manner as in EXAMPLE 7. Subsequently, the electrode plate assembly was heat-pressed to adhere the resin composition 142 and the steel plate 141 so that the current collectors were bonded to each other. In the same manner as in EXAMPLE 7, a bipolar nickel-metal hydride storage battery was fabricated. This battery was referred to as Battery N of COMPARATIVE EXAMPLE 7. Battery N corresponds to the battery disclosed in Japanese Patent Publication No.2993069.

Evaluation

Batteries I to N were all nickel-metal hydride storage batteries with an operating voltage of 3.6 V, and the theoretical capacity of each battery was 600 mAh. For the purpose of activating Batteries I to N, the batteries underwent five cycles of charge/discharge. The pattern of one cycle was that the battery was charged at a current of 0.1 C for 16 hours, put to a one-hour rest, discharged at a current of 0.2 C until the battery voltage reached 3.0 V and then put to another one-hour rest.

Next, the charge/discharge cycle life of each of the activated Batteries I to N was measured. The pattern repeated herein was that the battery was charged at a current of 0.5 C up to 105% of the theoretical capacity, put to a 30-minute rest, discharged at a current of 0.5 C until the battery voltage reached 3 V, and then put to another 30-minute rest. Then, the number of the cycles until the discharge capacity became 70% of the initial capacity was counted. The results were shown in Table 4.

TABLE 4

| Battery | Number of charge/discharge cycle (time) |
|---|---|
| I | 235 |
| J | 378 |
| K | 228 |
| L | 38 |
| M | 73 |
| N | 67 |

As shown in Table 4, the cycle lives of Batteries L, M and N were very short. This is presumably because insufficient prevention of creeping of the electrolyte due to the electrocapillary action leads to a short circuit between the cells, resulting in variation in charged state of the cell. On the other hand, in Batteries I to K where the insulating oxide layer was arranged on the periphery of the bipolar current collectors, the insulating oxide layer effectively prevented the creeping of the electrolyte, resulting in obtainment of a favorable cycle life.

Next, drop tests were conducted on Batteries I to N after the activation, in the same manner as in the drop tests on Batteries D to H. The capacity maintenance ratios of the batteries before and after the drops were shown in Table 5.

TABLE 5

| Battery | Capacity maintenance ratio before drop (%) | Capacity maintenance ratio after drop (%) |
|---|---|---|
| I | 80.5 | 80.2 |
| J | 80.1 | 75.2 |
| K | 80.3 | 23.8 |
| L | 23.2 | 0 |
| M | 68.7 | 10.3 |
| N | 63.4 | 15.4 |

As shown in Table 5, the capacity maintenance ratios of Batteries L, M and N were considerably low even before the drop process. This is presumably because a short circuit between the cells caused by the electrolyte intensified the self-discharge.

Battery K demonstrated a favorable capacity maintenance ratio before the drop, but it largely decreased after the drop. This is presumably because the epoxy resin sealing the cell was separated from the bipolar current collectors due to the shock of the drop, and the creeping of the electrolyte occurred. On the other hand, the capacity maintenance ratios of Batteries I and J remained favorable before and after the drop.

As apparent from the above description, according to a preferable embodiment of the present invention, it is possible to provide a reliable electrochemical device with liquid leakage suppressed. Also, according to a preferable embodiment of the present invention, it is possible to provide a low-cost, reliable sealed alkaline storage battery. Further, according to a preferable embodiment of the present invention, it is possible to provide a low-cost, long-life, reliable bipolar alkaline storage battery.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A sealed electrochemical device comprising at least two elements for power generation and at least one lead for electrically connecting said at least two elements for power generation,
    wherein each of said elements for power generation is not sealed and each comprises an electrolyte and at least one electrode plate;
    said at least one lead electrically connects said at least two elements for power generation that are not sealed;
    said electrolyte comprises a solute and a solvent dissolving said solute; and
    said lead has an insulating oxide layer for preventing said electrolyte from creeping on at least part of the surface of said lead.

2. The sealed electrochemical device in accordance with claim 1, wherein said electrolyte is in liquid form or gelated form, said solute comprises an alkali metal hydroxide, and said solvent comprises water.

3. The sealed electrochemical device in accordance with claim 1, wherein said insulating oxide layer has a thickness of 10 μm or more and 200 μm or less.

* * * * *